US008166003B2

(12) United States Patent
Friesenhahn et al.

(10) Patent No.: US 8,166,003 B2
(45) Date of Patent: Apr. 24, 2012

(54) PERMISSION-BASED DOCUMENT SERVER

(75) Inventors: Dustin G. Friesenhahn, Redmond, WA (US); Mingquan Xue, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/418,746

(22) Filed: May 5, 2006

(65) Prior Publication Data

US 2007/0260648 A1    Nov. 8, 2007

(51) Int. Cl.
*G06F 17/30* (2006.01)
(52) U.S. Cl. ........................................................ 707/695
(58) Field of Classification Search ................. 707/203, 707/204, 695, 783
See application file for complete search history.

(56) References Cited

U.S. PATENT DOCUMENTS

| | | | |
|---|---|---|---|
| 5,806,078 A | 9/1998 | Hug et al. | |
| 5,835,601 A | 11/1998 | Shimbo et al. | |
| 5,890,176 A | 3/1999 | Kish et al. | |
| 6,067,551 A | 5/2000 | Brown et al. | |
| 6,223,343 B1* | 4/2001 | Hopwood et al. | 717/101 |
| 6,584,466 B1* | 6/2003 | Serbinis et al. | 707/10 |
| 6,640,307 B2* | 10/2003 | Viets et al. | 726/15 |
| 6,647,421 B1* | 11/2003 | Logue et al. | 709/226 |
| 6,751,352 B1* | 6/2004 | Baharav et al. | 382/183 |
| 6,931,590 B2 | 8/2005 | Kanie et al. | |
| 6,983,417 B2* | 1/2006 | Kagimasa et al. | 715/255 |
| 7,111,232 B1* | 9/2006 | Bascom | 715/209 |
| 7,296,037 B1* | 11/2007 | Kruy et al. | 707/203 |
| 2001/0029522 A1* | 10/2001 | Yoshimine et al. | 709/203 |
| 2002/0019827 A1* | 2/2002 | Shiman et al. | 707/200 |
| 2003/0074455 A1 | 4/2003 | Banning et al. | |
| 2003/0115481 A1 | 6/2003 | Baird et al. | |
| 2003/0212718 A1 | 11/2003 | Tester | |
| 2004/0225730 A1 | 11/2004 | Brown et al. | |
| 2005/0060370 A1 | 3/2005 | Xue et al. | |
| 2005/0071755 A1* | 3/2005 | Harrington et al. | 715/511 |
| 2005/0097441 A1* | 5/2005 | Herbach et al. | 715/501.1 |
| 2005/0149544 A1* | 7/2005 | Bishop et al. | 707/101 |
| 2005/0209812 A1 | 9/2005 | Decker et al. | |
| 2006/0047682 A1 | 3/2006 | Black et al. | |
| 2006/0080316 A1 | 4/2006 | Gilmore et al. | |
| 2006/0149739 A1* | 7/2006 | Myers | 707/9 |
| 2006/0184452 A1* | 8/2006 | Barnes et al. | 705/50 |
| 2007/0214497 A1* | 9/2007 | Montgomery et al. | 726/4 |

OTHER PUBLICATIONS

Picard,W., "Towards support systems for non-monolithic collaborative document edition: the document-group-message model", Aug. 30-Sep. 3, 2004, pp. xx+1046, http://Ieeexplore.ieee.org/search/srchabstract.jsp?arnumber=1333484&isnumber=29439&punumber=9266&k2dockey=1333484@ieeecnfs&query=%28+document+version+%3Cor%3E+%28++document+version+%3Cin%3Eab+%29+%29%3Cor%3E+%28++document+version+%3Cin%3Ejn+%29&pos=2.

Haake et al., "Take Cover: Exploiting Version Support in Cooperative Systems", http://www.pi6.fernuni-hagen.de/publ/interchi93_A4.pdf.

Chien et al., "A Comparative Study of Version Management Schemes for XML Documents", http://www.cs.auc.dk/research/DP/tdb/TimeCenter/TimeCenterPublications/TR-51.pdf.

International Search Report mailed Dec. 18, 2007, in PCT/US2007/010875 (Publ. WO 2007/130596).

* cited by examiner

*Primary Examiner* — James Trujillo
*Assistant Examiner* — Jorge A Casanova
(74) *Attorney, Agent, or Firm* — Merchant & Gould

(57) ABSTRACT

Detailed herein is a technology which, among other things, identifies and provides an audience-appropriate version of a document, upon request. In one approach to this technology, a request for the document is received at a document-specific access point associated with that document. This document request is associated with specific file access authorizations. These specific file access authorizations are used to identify one of the available versions of the document. The version of the document so identified is then retrieved.

20 Claims, 8 Drawing Sheets

Exemplary Network 200

PERMISSION-BASED DOCUMENT SERVER

BACKGROUND

The contents of a document, particularly in a business environment, are likely to change multiple times throughout the lifespan of the document. Content, be it software code, a business plan, an operations manual, or any other form of data, can be drafted, edited, revised, and expanded upon for years. In this way, many different versions of a document will be created.

The intended audience of a document is also likely to change with time. During the initial drafting, for example, only the author is likely to view the document. Later, a supervisor or editor might be involved, and need to see the current version of the document. Some versions of a document might be suitable for wide distribution, while other versions should be more closely held.

Consequently, content providers may disseminate different versions of the document through different access points. For example, a limited release document, such as the initial draft of the second revision of a document, would be accessible to the author of the document at one URL, while a general release of the first revision of the document is accessible to the public at a second URL, and a more detailed release of the first revision of the document is available to a select group at a third URL. Maintaining multiple access points is problematic, in that it is cumbersome, inflexible, and requires significant overhead to ensure that each and every access point for all versions of the document are maintained and updated appropriately.

SUMMARY

Detailed herein is a technology which, among other things, identifies and provides an audience-appropriate version of a document, upon request. When a user requests access to document, the technology determines what the user is permitted to see. Thus, different users reaching the document to the same access point, like a URL, will obtain different versions of the document, depending on what each is privileged to access.

In one approach to this technology, a request for the document is received at a document-specific access point, such as a uniform resource locator, or URL, associated with that document. This document request is associated with specific file access authorizations, such as an individual user's permissions to access files. These specific file access authorizations are used to identify one of the available versions of the document, for example, by comparing them with a file access permissions associated with each version of the document. The version of the document so identified is then retrieved.

Another approach to this technology is a document server, set up to return the most recent version of a document upon request. The document server includes a network module, through which data is transferred. The network module is connected to a document storage module, such as an SQL database, which is used for storing the multiple versions of the document. Each of these multiple versions is associated with required permissions for accessing it. The document server uses an identification module to identify the clearance level associated with a document request, for example, by determining what clearance level the requesting user has. An authorization module compares the clearance level associated with the document request with the required permissions associated with each of the versions of the document, and retrieves the appropriate version of the document.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE FIGURES

The accompanying drawings, which are incorporated in and form a part of this specification, illustrate embodiments and, together with the description, serve to explain the principles of the claimed subject matter:

DETAILED DESCRIPTION

Figure 1:
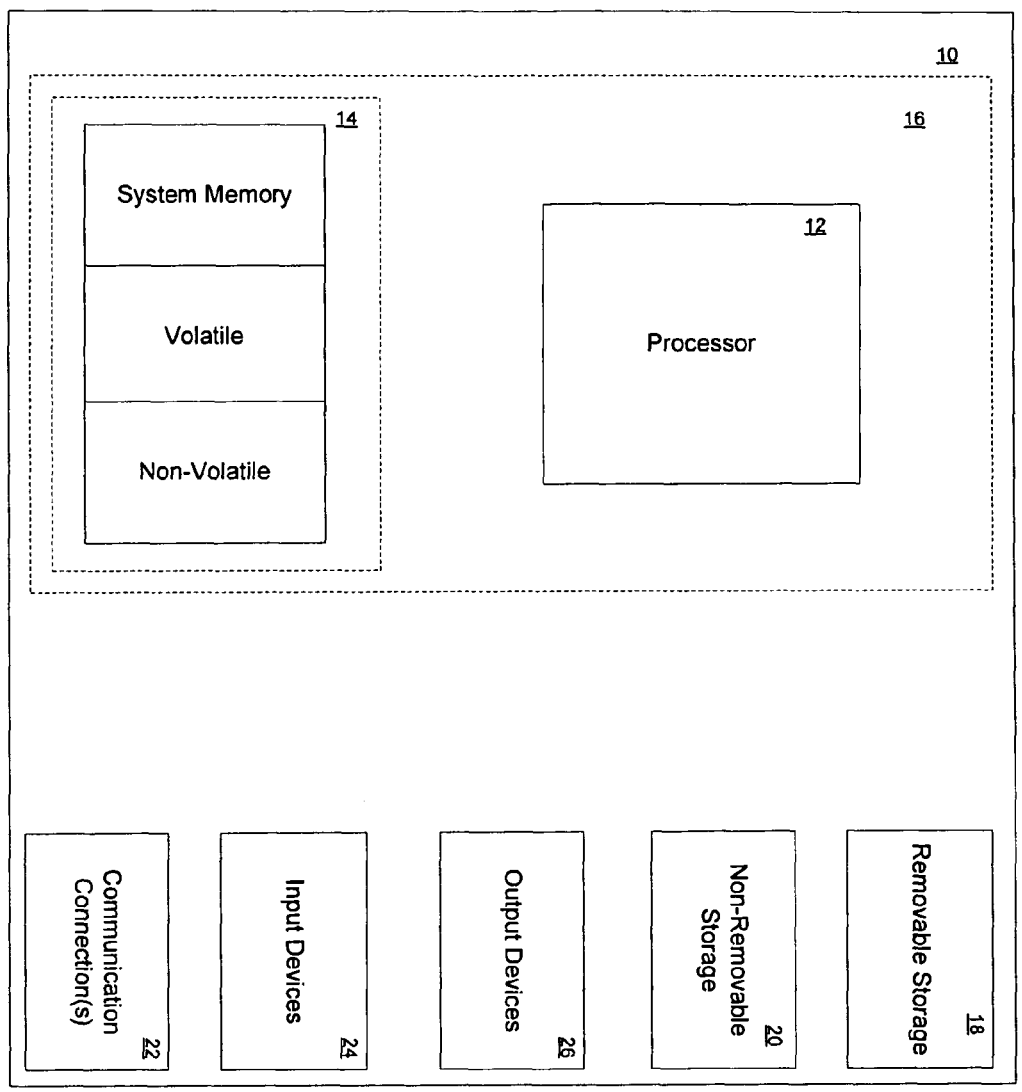
FIG. 1 is a block diagram of an exemplary computing system upon which embodiments may be implemented.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein (e.g., FIG. 6) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices, such as computing system environment 10 or document server 100, typically include at least some form of computer readable media. Computer readable media can be any available media that can be accessed by a computing device. By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Computer readable media typically embodies computer readable instructions, data structures, program modules, or other data in a modulated data signals such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Existing version control systems provide some control over document versions and audience restrictions. Generally, this is accomplished by providing multiple ways of accessing content, with different access points for returning different levels of content. This can be accomplished by providing different address information, e.g., a different URL link for each different version of the document, or by copying the content to a different location.

A major limitation is inherent in this approach to version control, namely that the intended audience cannot always retrieve the latest version of the content from a single access point.

As presented in the claimed subject matter, and exemplified by the following embodiments, a technology is presented which allows multiple users, from multiple different audiences, to reach different versions of a document from the same access point.

In the following embodiments, a document server is described. The document server provides a single access point, from which the latest version of the document can be retrieved. In some embodiments, the document server also provides audience-specific security, in that different versions of the document can be restricted to certain audiences alone. In some such embodiments, the document server allows for differing "levels" of the document, such that one audience may have access to one level of the document, while another audience can access a second level. Additionally, in some embodiments, the document server also allows for every version of a document to be accessible through a unique address pointer.

Basic Computing Device

With reference to FIG. 1, an exemplary system for implementing embodiments includes a general purpose computing system environment, such as computing system environment 10. In its most basic configuration, computing system environment 10 typically includes at least one processing unit 12 and memory 14. Depending on the exact configuration and type of computing system environment, memory 14 may be volatile (such as RAM), non-volatile (such as ROM, flash memory, etc.) or some combination of the two. This most basic configuration is illustrated in FIG. 1 by dashed line 16. Additionally, computing system environment 10 may also have additional features/functionality. For example, computing system environment 10 may also include additional storage (removable and/or non-removable) including, but not limited to, magnetic or optical disks or tape. Such additional storage is illustrated in FIG. 1 by removable storage 18 and non-removable storage 20. Computer storage media includes volatile and nonvolatile, removable and non-removable media implemented in any method or technology for storage of information such as computer readable instructions, data structures, program modules or other data. Memory 14, removable storage 18 and nonremovable storage 20 are all examples of computer storage media.

Computing system environment 10 may also contain communications connection 22 that allow it to communicate with other devices. Communications connection 22 is an example of communication media.

Computing system environment 10 may also have input device(s) 24 such as a keyboard, mouse, pen, voice input device, touch input device, etc. Output device(s) 26 such as a display, speakers, printer, etc. may also be included. All these devices are well known in the art and need not be discussed at length here.

Document Server

Figure 2:
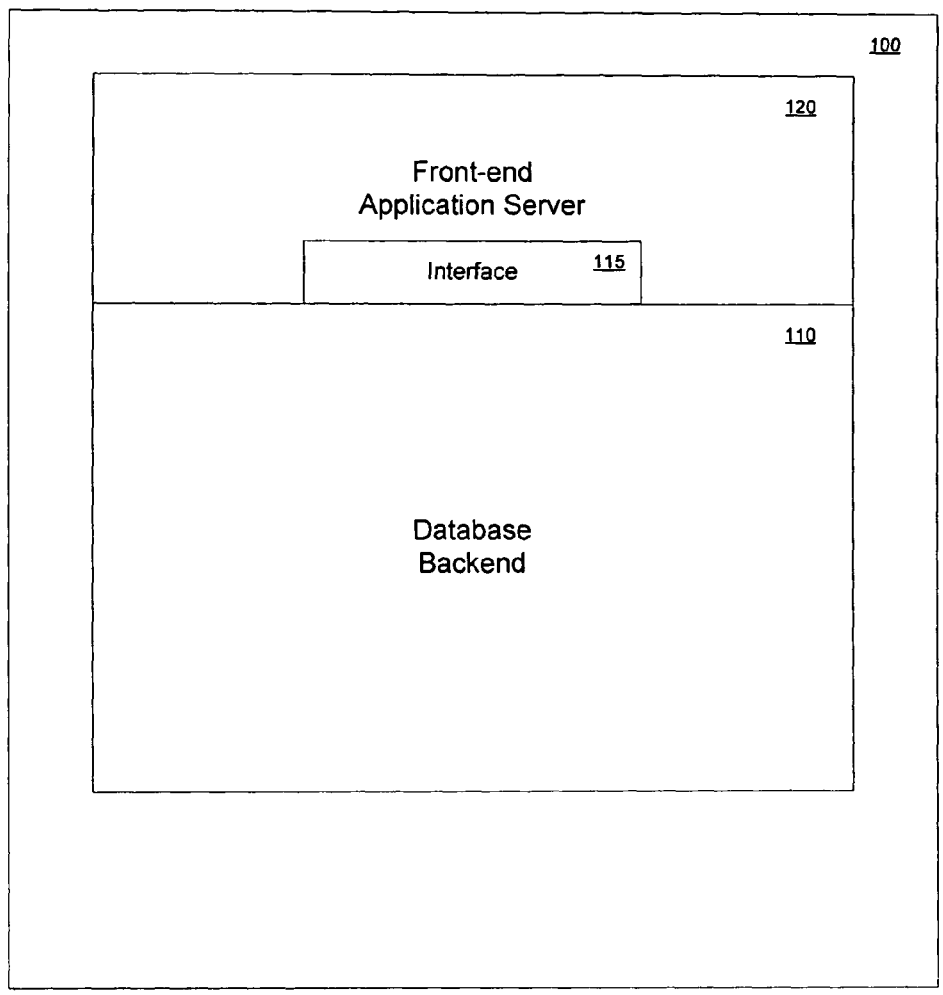
FIG. 2 is a block diagram of a document server, in accordance with one embodiment.

With reference now to FIG. 2, a block diagram of a document server is depicted, in accordance with one embodiment. It is understood that while FIG. 2 depicts a document server 100 having certain enumerated features, embodiments can be practiced on systems having different, additional, or fewer elements. Document server 100 is depicted as having a database backend 110. Document server 100 also is shown as having a front-end application server 120. Front-end application server 120 and database backend 110 communicate via interface 115. In some embodiments, document server 100 would be implemented as part of a computing device, e.g., computing system environment 10.

Database backend 110, in some embodiments, is a software database. Many types of database are known, and are suitable for use with an embodiment, e.g., an SQL database. Further, while document server 110 is depicted as a single system, embodiments of the present invention include having database backend 110 hosted on a separate computer system, e.g., a network-accessible database server.

Interface 115, in some embodiments, is a software application programming interface, or API. In other embodiments, interface 115 is a hardware connection between front-end application server 120 and database backend 110, e.g., a network connection. In embodiments where interface 115 is included in document server 100, interface 115 allows communication between front-end application server 120 and database backend 110.

Front-end application server 120, in some embodiments, performs document retrieval, in response to a request from a user of document server 100. In some embodiments, front-end application server 120 also provides the user interface for access to document server 100. In other embodiments, front-end application server 120 is accessed through a separate user interface. In some embodiments, front-end application server 120 can perform additional tasks, e.g., in one embodiment, front-end application server 120 is a portal server application.

Exemplary Network

Figure 3:
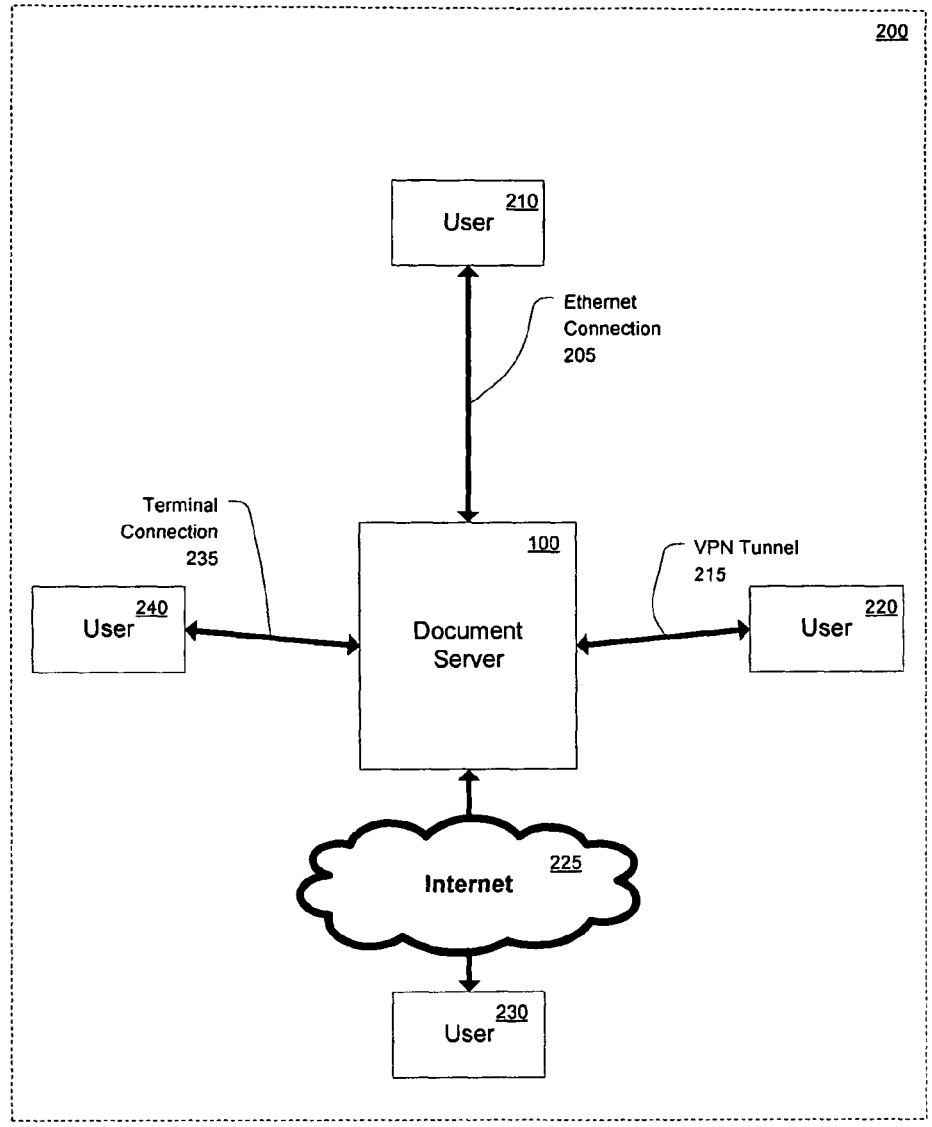
FIG. 3 is a diagram of an exemplary computing network, upon which Embodiments may be implemented.

With reference now to FIG. 3, an exemplary network 200 is depicted, in accordance with one embodiment. It is understood that while FIG. 3 depicts a network 200 having certain enumerated features, embodiments can be practiced in networking environments having different, and additional, or fewer elements. In particular, while exemplary network 200 is depicted as having certain specific network connections between the users and the document server, it should be understood that embodiments can be practiced on networks involving many different network connection types.

In the embodiment depicted in FIG. 3, a document server 100 is depicted as being accessed by a plurality of users over a number of different types of network connection. User 210 accesses document server 100 via ethernet connection 205. User 220 accesses document server 100 via a virtual private networking (VPN) tunnel 215. User 230 communicates with document server 100 through the Internet 225, e.g., via a hypertext transfer protocol (HTTP) connection. User 240 accesses document server 100 via a terminal connection 235. The types of networking connections that are supported by different embodiments will vary by the intended application of document server 100, and/or by the audience intended to access documents stored on document server 100.

Security, Levels, and the Audience

In many situations, the intended to viewing audience for document will change over the course of the document's lifetime. Additionally, particularly when the document is subject to frequent revision, different people will have access to different versions of the document at a given time. For example, when transitioning between an existing version of a published document the next revision of the document, the existing published document remains available, even as the author revises the next draft of the document.

To handle situations such as these, it is helpful to establish different versions of the document. In some embodiments, a scheme of document "levels" is utilized for this differentiation. This scheme provides a hierarchical approach to document versioning, in which some business practice allows a document transition from one level to the next. In some such embodiments, a particular version of the document is uniquely identified by a combination of the document name and the level which it currently is.

Figure 4:
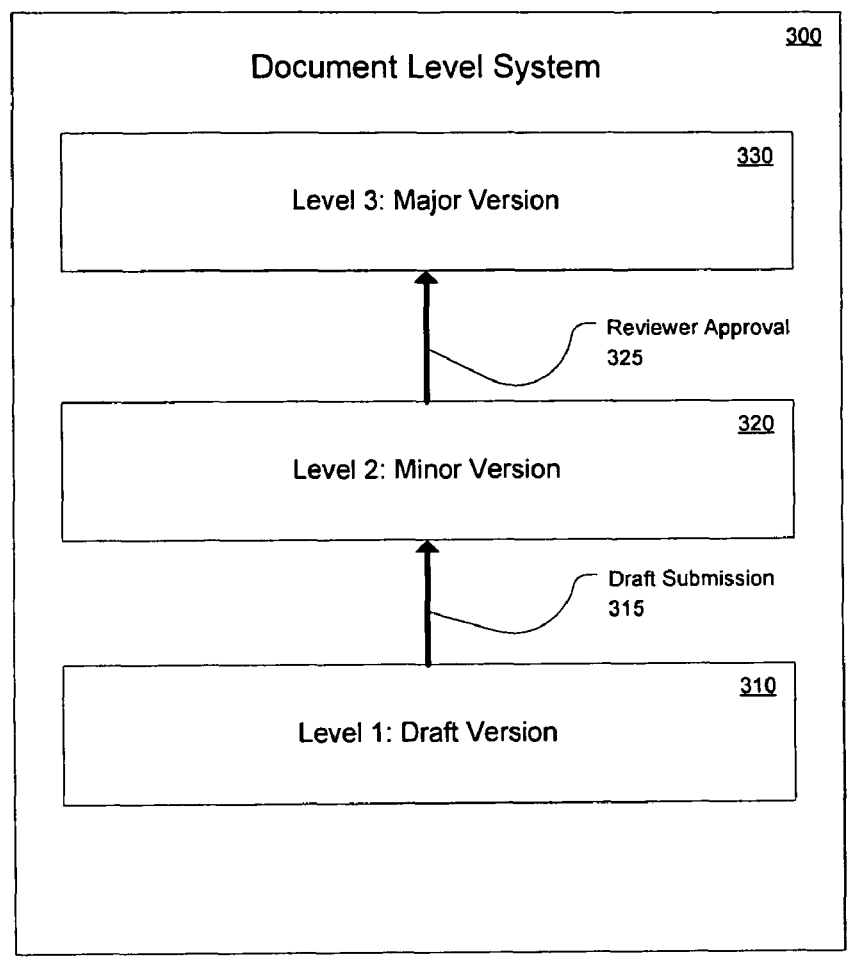
FIG. 4 is a representation of a document level system, in accordance with one embodiment.

With reference now to FIG. 4, a document level system 300 is depicted, it accordance with one embodiment. While FIG. 3 depicts document level system 300 and as having a discrete number of levels, it should be understood that embodiments can be practiced with document level systems having an arbitrary number of levels. Further, while document level system 300 provides exemplary business practices for transitioning between levels, other embodiments utilize different means for transitions between levels.

Level 1 of document level system 300 is utilized for a draft version 310 of the document. In some situations, the draft, or checked out, version of the document may only be available to the author of the document. In other circumstances, a wider audience may be able to view the draft, such as the author's supervisors, while only the author may be able to make changes to the draft.

Level 2 of document level system 300 is set aside for a minor version 320 of the document. Sometimes, the minor version of the document will have a wider audience than the initial draft to document, and can be used as part of a review process.

A document that has reached level 3 of document level system 300 is a major version 330 of the document. Often, a major version of the document is suitable for the widest distribution, and represents a finalized document version.

As shown in FIG. 4, transition between levels 1, 2, and 3 is accomplished by means of certain business practices. The transition from draft version 310 to minor version 320 is shown occurring as a result of draft submission 315. The transition from minor version 320 to major version 330 requires supervisor approval 325.

While document level system 300 is here portrayed as allowing a document to go from a draft version to a major version, it is easily applicable to other situations as well. In some embodiments, for example, the level system is utilized as a security mechanism, wherein the document version with the widest audience, e.g., level 3 documents, contain less information then document versions with a narrower intended audience.

Audience Restrictions

Restricting access to different document versions is a problem with two parts. First, it is necessary to determine who the current audience is, e.g., to identify and authenticate a particular user of the system. Second, it is necessary to determine whether this audience should be allowed to access a particular document version.

Identification and authentication of the audience can be accomplished in numerous ways. In one embodiment, for example, a user logs into a portal server before attempting to access any documents. In another embodiment, authentication might stem from whether the user is accessing the document server over the Internet, or through a local network connection. Embodiments of the present invention are well suited for use with any method of identification and authentication.

Determining whether a user should be allowed to access a particular document version can also be handled in a number of ways. For example, each user can be assigned certain permissions, based upon whether the user is part of a certain specified audience, e.g., document reviewers at a company. Each document version is likewise assigned certain permissions, e.g., based on what level of revision the document is at. By comparing the permissions of the document with the permissions of the audience, access can be granted or denied.

In some embodiments, in order to enable the above-described level functionality, the different versions of the document include information regarding which level they are. In some embodiments, each document version also includes information regarding the intended audience.

Figure 5:
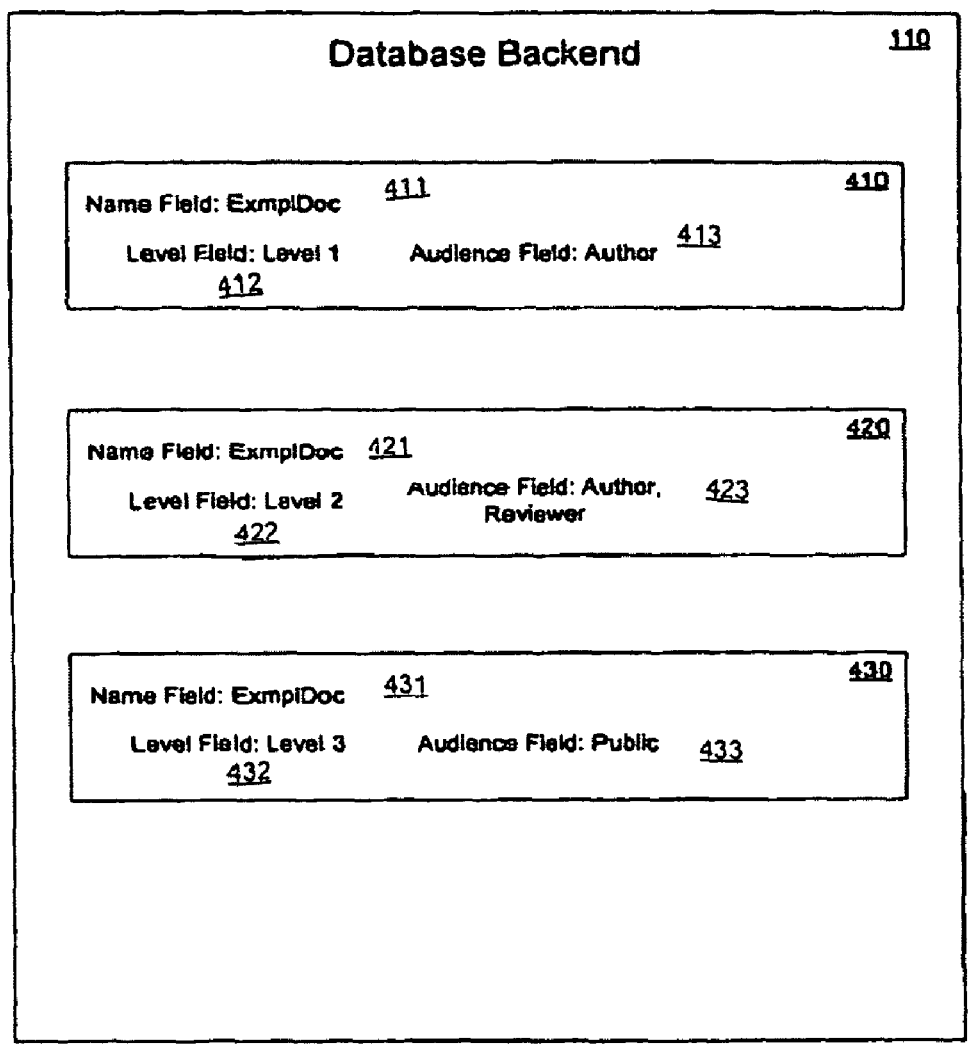
FIG. 5 is a block diagram of a database backend, in accordance with one embodiment.

With reference now FIG. 5, a block diagram of a database backend 110 is depicted, in accordance with one embodiment. FIG. 5 depicts one approach to storing it is necessary data. Database backend 110 is shown as containing three versions of the document ExmplDoc, each at a different level of document level system 300. Each of these three versions is stored in such a way as to uniquely identify each particular version of the document.

File 410 includes a name field 411, containing the name of the document, ExmplDoc. File 410 also contains a level field 412, identifying the level of document level system 300, here level 1. In some embodiments, the combination of these two fields will uniquely identify this particular version of this particular document. In some embodiments, a version field is utilized instead of, or in addition to, a level field. The version field can identify both the level and provide a version number to help identify the latest version of the file, e.g., a version field entry of 1.10.1 may indicate a first major release, 10th revision, at level 1. Some embodiments also include audience field 413, which specifies who is allowed to access this file, here, just the author. Other embodiments omit the audience field; several such embodiments restrict access to the file based upon level field 412.

File 420 includes name field 421, level field 422, and audience field 423. Because file 420 is a minor release, audience field 423 reflects a larger potential audience, e.g., the original author and a reviewer. File 430 includes name field 431, level field 432, and audience field 433. Because file 430 is a major release, audience field 433 reflects a still larger potential audience, e.g., the general public. It is understood that while FIG. 5 presents progressively larger potential audiences, in some embodiments the nature of the audience for each level may change in different ways.

Some embodiments, rather than using database fields, incorporate the level version and/or the audience information into the file itself, e.g., using document metadata. Still other embodiments make use of the underlying filesystem of database backend 110 to track level and/or audience information. Other embodiments use other methods of tracking or storing this information.

Unified Document Access Point

Rather than having different access points, each returning different versions of the document, some embodiments provide a single, unified document access point. A user accessing the document through this unified document access point will receive the most recent version of the document which he is allowed to view. For example, with reference to FIG. 5, files 410, 420, and 430 would all be reached via the same unified document access point. Which version of the file is returned would vary, depending upon the permissions of the user attempting access; e.g., the author accessing the unified document access point for the ExmplDoc document would receive file 410, while a member of the general public accessing the same access point would receive file 430.

The nature of the access point will vary with different embodiments. For example, in an embodiment where the document server is part of a portal server, an access point is presented in as a uniform resource locator (URL), and can be reached through use of browser software. In other embodiments, different types of access points can be used to similar effect.

Figure 6:
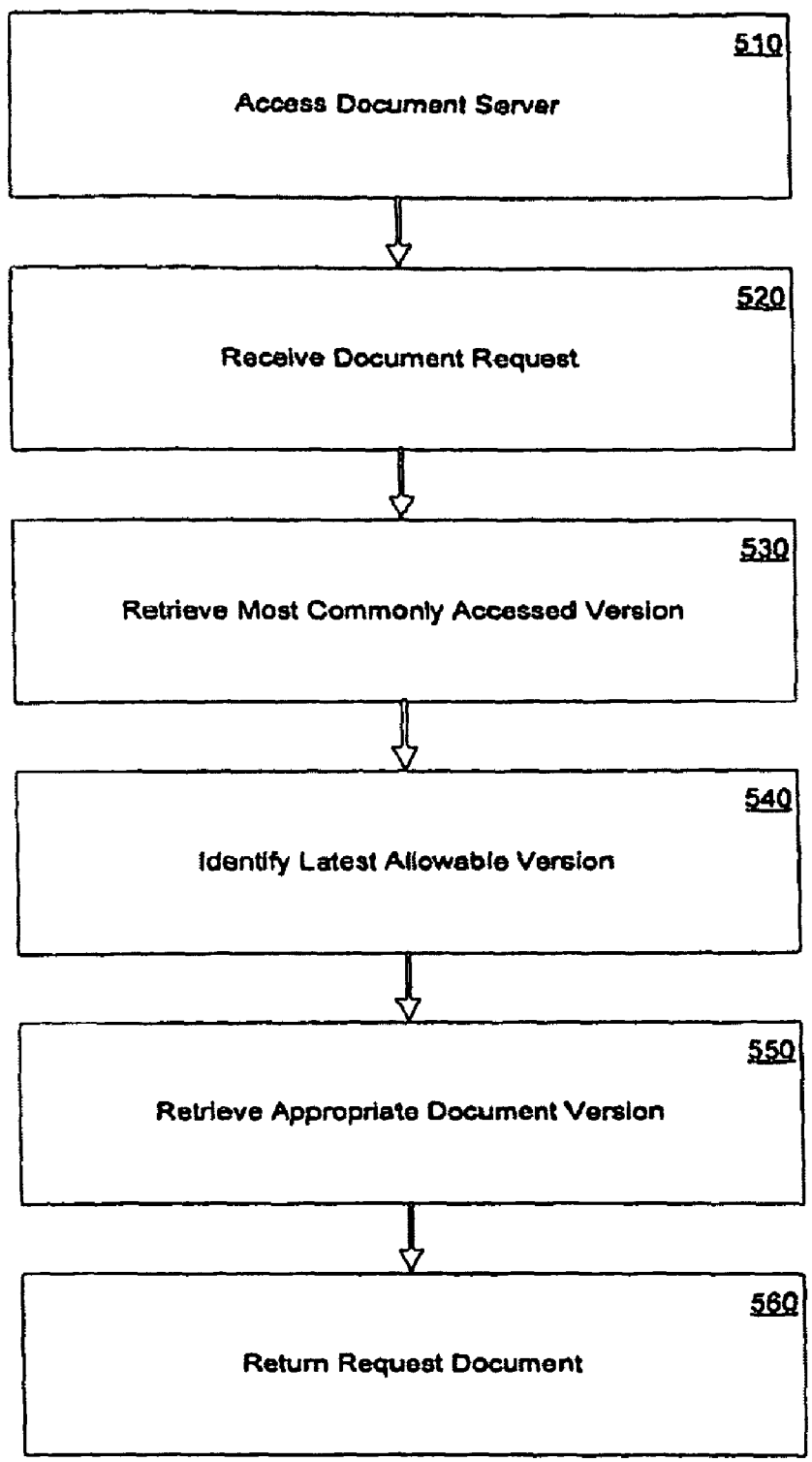
FIG. 6 is a flowchart of a method of serving an audience-appropriate version of a document, in accordance with one embodiment.

With reference now to FIG. 6, a flowchart 500 of a method of serving an audience-appropriate version of a document is presented, in accordance with one embodiment. Although specific steps are disclosed in flowchart 500, such steps are exemplary. That is, embodiments of the present invention are well suited to performing various other (additional) steps or variations of the steps recited in flowchart 500. It is appreciated that the steps in flowchart 500 may be performed in an order different than presented, and that not all of the steps in flowchart 500 may be performed.

With reference to step 510, a document server is accessed. In some embodiments, the step also includes authenticating the user accessing the document server. In several such embodiments, the file access authorizations or security clearances of the user are available to the document server. For example, with reference to FIG. 3, these are 210 connects to document server 100 over ethernet connection 205. In embodiments where document server 100 is part of a portal server, user 210 would log into the portal server, and be authenticated. In other embodiments, alternative authentication methods are utilized.

With reference to step 520, the document server receives a request to access a document through the document's access point. Such a request could require action on the part of the user, e.g., selecting a particular document access, or could be an automatic response to the user's logging in, e.g., the user logs into a portal server, and the system automatically retrieves the last document the user was viewing.

With reference to step 530, the document server retrieves the version of the document most commonly accessed. In some embodiments, automatically retrieving the most commonly viewed version of the document is faster than first determining which version the user should be viewing. For example, with reference to FIG. 5, if the most commonly viewed version of ExamplDoc is file 430, the publicly-accessible major version, then the document server will automatically retrieve that version. In some embodiments, this step will vary, e.g., in one embodiment, a document version will only be pre-fetched if it represents the majority of document accesses; in another, an administrator can configure a threshold value. Other embodiments omit this step.

With reference to step 540, the document server performs a permissions check. With reference to FIG. 3, document server 100 compares user 210's authorizations with the file access permissions of the different versions of the document available.

In some embodiments which include step 530, user 210's authorizations are compared first with the most commonly accessed document. If the user's authorizations are insufficient to view the most commonly accessed document, document server 100 looks for a less-restricted version. If the user's authorizations are greater than required for access to the most commonly viewed version, document server 100 looks for a more-restricted version.

In other embodiments, document server 100 identifies the latest version of the requested document that user 210 has sufficient authorizations to view.

With reference to step 550, the document server retrieves the appropriate document. In some embodiments which implement step 530, the most commonly viewed document may be the appropriate document, in which case it has already been retrieved; if the user is limited to, or entitled to, a different version, then the appropriate document must be retrieved. For example, with reference to FIGS. 3 and 5, if the most commonly viewed version of ExamplDoc is file 430, and user 210, the author of the document, accesses document server 100, then document server 100 would need to retrieve file 410, the draft version of the document.

With reference now to step 560, the document server supplies the requested document. The form of this transaction varies with different embodiments. For example, in some embodiments the document will be displayed in a browser window, while in others, the document will be transmitted as a file; other embodiments handle this transaction in other ways.

Viewing Other Versions

In some embodiments, it is useful for a more-privileged user to be able to view less-restricted versions of the document. Similarly, is sometimes useful to be able to view older versions of the document. In several such embodiments, therefore, every version of the document is retrievable by using an access point unique to that particular version. For example, with reference to FIG. 5, if the author of the ExmplDoc document wished to view file 420, he could navigate to the access point specific to file 420.

Components of a Document Server

Figure 7:
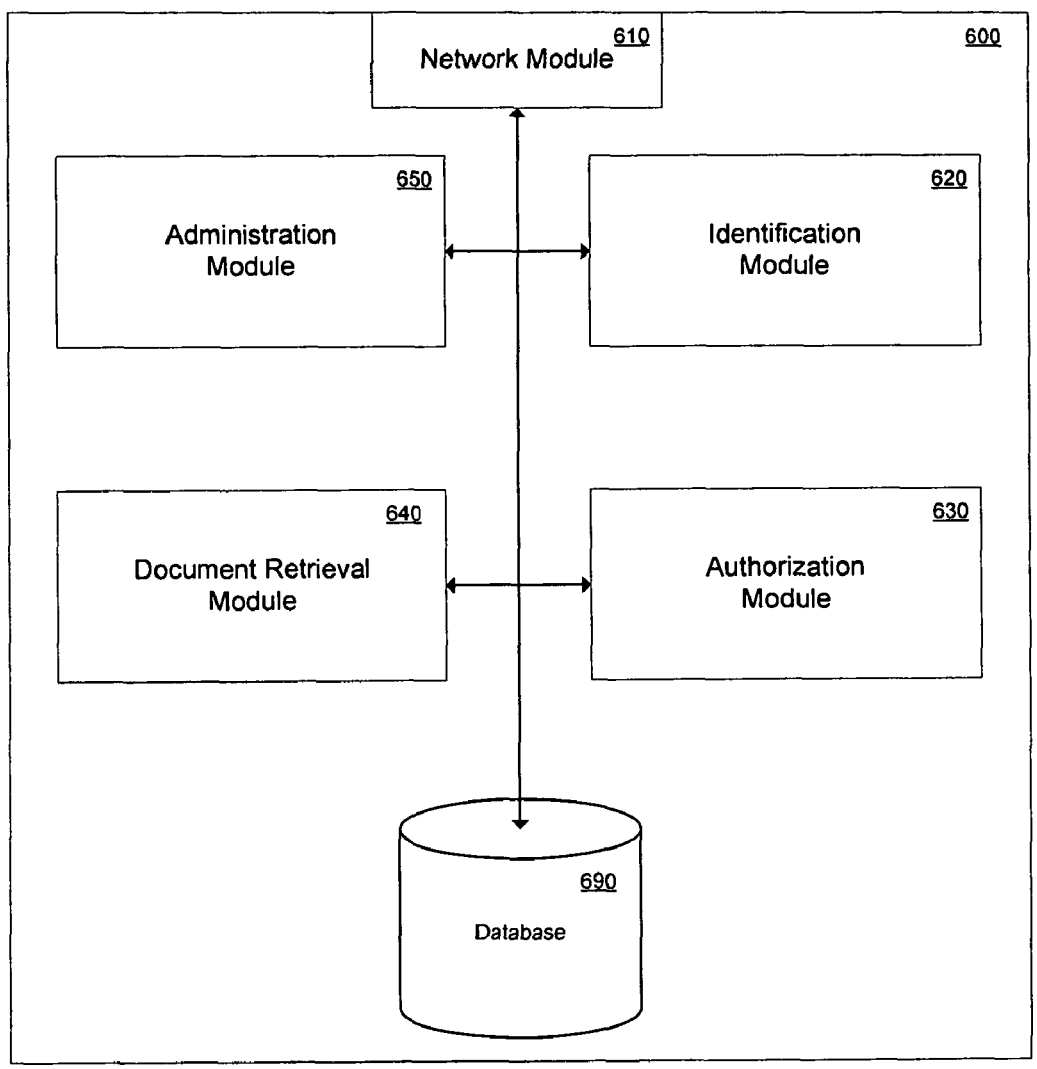
FIG. 7 is a block diagram of a document server, in accordance with one embodiment.

With reference now to FIG. 7, a block diagram of a document server 600 is depicted, in accordance with one embodiment. While document server 600 is depicted as including specific components, it is understood that embodiments are well suited to implementation on document servers having alternative configurations or components. In particular, while document server 600 is presented as a collection of discrete components, some embodiments condense the tasks performed into fewer components, while other embodiments spread these tasks across additional components.

Document server 600 is depicted as having network module 610. Network module 610, in the depicted embodiment, allows data to enter or leave document server 600. For example, requests from a user for a document are received at network module 610, while retrieved documents are transmitted from document server 600 through network module 610. In some embodiments, document server 600 incorporates multiple network modules, e.g., compatible with different methods of data transferal, or for separate input and output paths.

Document server 600 is also depicted as incorporating identification module 620. Identification module 620 attempts to identify a particular user, e.g., by allowing a user to log on to document server 600, or by identifying a specific user by their computer. Different embodiments may incorporate one or more different identification routines. In some embodiments, identification module 620 also identifies the user's clearance level.

Document server 600 is shown as including authorization module 630. Authorization module 630, in some embodiments, determines whether a user has an adequate clearance level to view a requested document. By comparing the user's clearance level, as identified by identification module 620, with the required clearance associated with the requested document, authorization module 630 can determine whether the requested document should be available to the user.

Authorization module 630, in some embodiments, also determines the appropriate document version to return to the user. Cross-referencing the user's clearance level and request with the available versions will allow authorization module 630 to determine the appropriate document version to return to the user.

Document server 600 includes document retrieval module 640. Document retrieval module 640, in some embodiments, retrieves the appropriate document version from an available document storage module, e.g., database 690, and forwards it to network module 610.

Document server 600 also includes administration module 650. Administration module 650 allows a server administrator to adjust settings for document server 600. Such settings can influence access to the document server itself, e.g., adding, editing, or removing user access to identification module 610. Administration module 650, in some embodiments, also allows a surfer administrator to change the required clearance associated with the document. Such a change could be limited to a particular file, e.g., a single version of a single document, or to all versions of a particular document. Alternatively, the administrator could change the clearance level necessary to access all document versions of a specific level, e.g., all minor versions. In other embodiments, combinations and permutations of these alterations are incorporated.

Version Broker

Some embodiments are well-suited for use as a version broker. In several such embodiments, the version broker acts as an interface between a user and data storage device. For example, in one embodiment, a version broker can be added to a portal server interface, and linked to a database structure. In this embodiment, the database is separate from the version broker itself. Additionally, in some embodiments, the interface with which the user interacts is also separated from the version broker.

Figure 8:
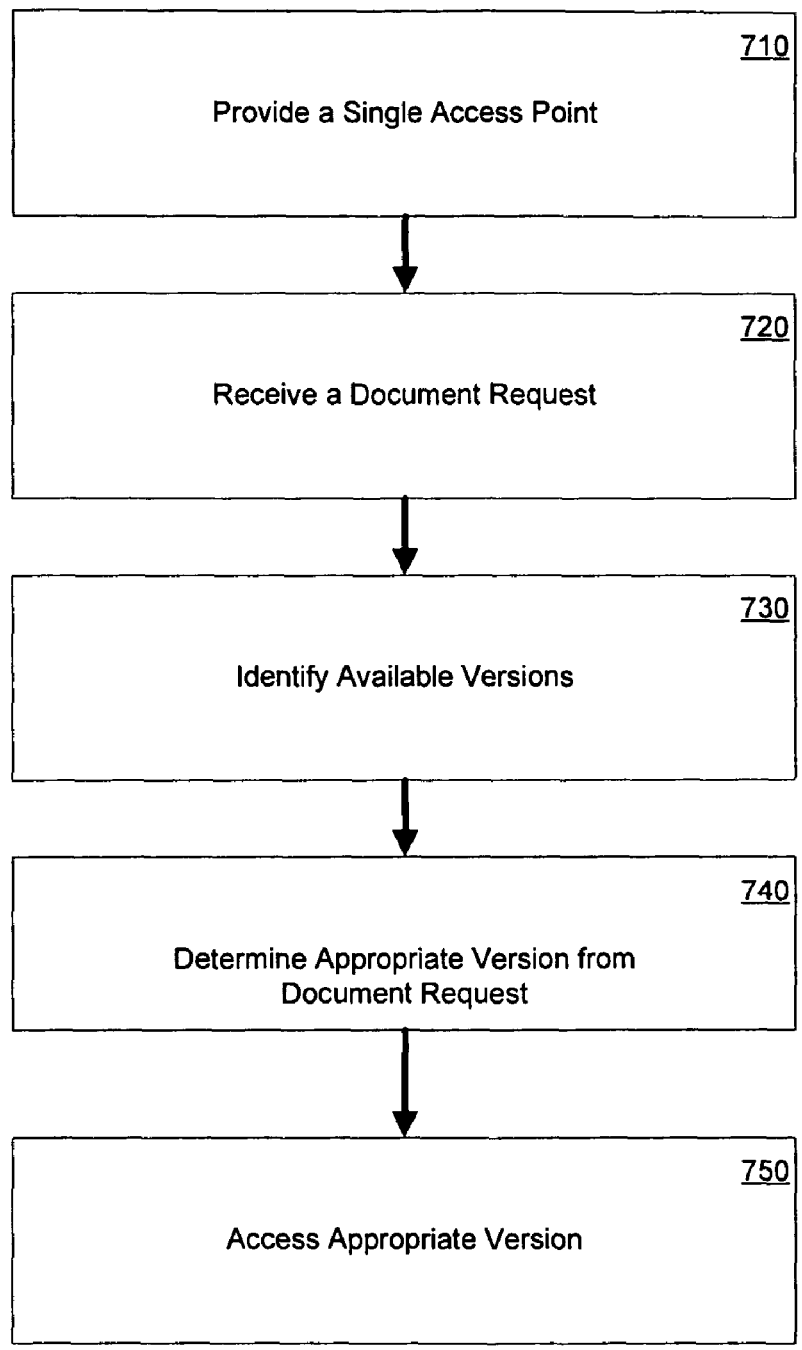
FIG. 8 is a flowchart of a method of utilizing a version broker, in accordance with one embodiment.

With reference to FIG. 8, a flowchart 700 of a method of utilizing a version broker is described, in accordance with one embodiment. Although specific steps are disclosed in flowchart 700, such steps are exemplary. That is, embodiments of the present invention are well suited to performing various other (additional) steps or variations of the steps recited in flowchart 700. It is appreciated that the steps in flowchart 700 may be performed in an order different than presented, and that not all of the steps in flowchart 700 may be performed.

With reference now to step 710, the version broker provides a single access point for document. In some embodiments, accessing the document through this access point will result in the retrieval of the most recent version of the document to which a user has access. In some embodiments, this single access point is implemented as a uniform resource locator (URL); in several such embodiments, document or fuel can therefore be performed using browser software. In other embodiments, the single access point is implanted in other ways.

With reference now to step 720, the version broker receives a document request. In some embodiments, this document request is received directly from a user, e.g., through a user interface inherent to the version broker. In other embodiments, the version broker receives the document request indirectly, e.g., a separate user interface receives a document request from the user, and passes the document request to the version broker. In some such embodiments, the user interface may format the document request to be compatible with a version broker. In other embodiments, no such formatting is necessary.

In some embodiments, the document request is accompanied by information regarding the requesting user's permissions. In other embodiments, the requesting user's permissions do not accompany the document request, but are available to the version broker. In still other embodiments, authentication of the user's permissions to access the document requested are handled in other ways, or are omitted.

With reference now to step 730, the version broker determines what versions of the document requested are available. In some embodiments, the version broker maintains a local listing of available documents, with the associated permissions required to access the different versions of these documents. In other embodiments, the version broker contacts the data storage device, and retrieves a listing of the available versions of the document requested. In some embodiments, this step is omitted.

With reference now to step 740, the version broker compares the document request with the different versions of the document, to find an appropriate, available version of the document. In some embodiments, the step entails determining which available version of the document the submitter of the document request is entitled to. For example, if an anonymous user submits a document request, the only version of a document available to such a user might be a publicly-available major release of the document. In some embodiments, the submitter of the document request may be entitled to multiple versions of the document; in some such embodiments, the version broker matches the document request with the most-restricted version of the document. For example, if the author of the document submits a document request, he may be entitled to view every version of the document; the version broker matches the document request with the most-restricted version of the document, which may be the most recent draft version.

With reference now to step 750, the version broker accesses the appropriate version of the document. In some embodiments, the version broker formulates a database request to retrieve the appropriate version of the document. In other embodiments, the version broker provides the separate user interface with the necessary information to retrieve the appropriate version of the document. In still other embodiments, the version broker recovers the document from the data storage, and returns it to the requesting entity. It is understood that embodiments are well-suited for use with many different methods of data storage and retrieval.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of providing an audience-appropriate version of the document, the computer-implemented method being arranged to cause a computer to perform actions, comprising:
    receiving a request for a document at a document access point associated with said document, said document comprising a plurality of document versions, wherein said request is associated with file access authorizations, and wherein said plurality of document versions are associated with file access permissions;
    determining which of the plurality of document versions of the document has a majority of previous document accesses;
    pre-fetching the determined document version for the document that has the majority of previous document accesses;
    identifying based on a match between a file access authorization associated with the request and a file access permission corresponding to the identified document version one of said plurality of document versions, wherein the file access permissions of said identified of document versions correspond to said file access authorizations, such that the file access permissions include a security level value indicating a security level of the document version and an audience field indicating an authorized audience, wherein each of the plurality of the document versions is uniquely identified by a combination of a name of the documents and the security level of the document version, wherein the security level indicates an audience allowed access to the document; wherein each of the plurality of document versions include a name field, a level field and the audience field; and
    retrieving said one of said plurality of document versions.

2. The computer-implemented method of claim 1, wherein said data access point comprises a uniform resource locator (URL).

3. The computer-implemented method of claim 1, further comprising:
    retrieving a most-commonly accessed version of said document; and
    comparing said file access authorizations with the file access permissions associated with said most-commonly accessed version of said document.

4. The computer-implemented method of claim 1, wherein said file access permissions comprise one of a plurality of access levels.

5. The computer-implemented method of claim 1, further comprising:
    authenticating a user; and
    such that the security level of the document is one of a plurality of security levels and the authorized audience is a subset of authorized users.

6. The computer-implemented method of claim 5, wherein said receiving a request comprises receiving a request from said user.

7. The computer-implemented method of claim 6, further comprising:
    returning said one of said plurality of document versions to said user.

8. A system for returning a most recent version of a document, said document server comprising:
    a memory and a processor;
    a network module for receiving a document request for a document, and transmitting a retrieved document version;
    a document storage module, coupled to said network module, for storing a plurality of document versions for the document, each of said plurality of document versions having an associated permission requirement, an associated security level and an authorized audience requirement, wherein each of the plurality of the document versions is uniquely identified by a combination of the documents name and the associated security level of the document, wherein the security level indicates an audience allowed access to the document;
    a document retrieval module that is coupled to the network module that determines the document version that has been accessed a majority of the time in previous document accesses and pre-fetches the determined most commonly accessed version of the document for the document before determining which of said plurality of document versions to provide in response to the request for the document;
    an identification module, coupled to said network module, for identifying a clearance level associated with said document request; and
    an authorization module, coupled to said identification module, for determining which of said plurality of document versions to retrieve, wherein said authorization module compares said clearance level associated with said document request with the associated permission requirement associated security level and authorized audience requirement for each of said plurality of document versions, and based on the comparison retrieves the determined version of the document.

9. The system of claim 8, further comprising:
a user interface, coupled to said network module, for receiving instructions and for displaying information.

10. The system of claim 8, wherein said document storage module comprises a database.

11. The system of claim 10, wherein said database comprises an SQL database.

12. The system of claim 8, further comprising:
an administration module, coupled with said document storage module, for setting said associated permission requirements for said plurality of document versions, such that the security level is one of a plurality of security levels and the authorized audience is a subset of authorized users.

13. The system of claim 12, wherein said associated permission requirements for said plurality of document versions comprise one of a plurality of access levels.

14. The system of claim 8, wherein, if more than one of said plurality of document versions corresponds to said document request, said authorization module retrieves a most recent version of said plurality of document versions.

15. A computer-readable storage medium having computer-executable instructions stored thereon causing a computer to perform actions comprising:
providing a single access point for accessing a plurality of versions of a document, each of said plurality of versions having associated permissions, the associated permissions including a security level and an authorized audience;
receiving a document request at said single access point, said document request comprising an authorization level;
determining which of the plurality of document versions of the document has a majority of previous document accesses;
retrieving the document version of the document that has the majority of previous document accesses;
after retrieving a most commonly accessed version of the document relating to the document request, comparing said authorization level with said associated security level and authorized audience permissions for each of said plurality of versions, wherein each of the plurality of the versions is uniquely identified by a combination of the documents name and the associated security level of the document version, wherein the security level indicates an audience allowed access to the document; and
based on the comparing, accessing one of said plurality of versions corresponding to said document request.

16. The computer-readable storage medium of claim 15, further comprising:
determining the availability of each of said plurality of versions.

17. The computer-readable storage medium of claim 16, further comprising:
determining the associated permissions for each of said plurality of versions;
and such that the security level is one of a plurality of security levels and the authorized audience is a subset of authorized users.

18. The computer-readable storage medium of claim 15, wherein said single access point comprises a uniform resource locator (URL).

19. The computer-readable storage medium of claim 18, further comprising:
providing a unique access point for each of said plurality of versions.

20. The computer-readable storage medium of claim 19, wherein each said unique access point comprises a URL.

\* \* \* \* \*